US012687241B2

(12) United States Patent
Yu et al.

(10) Patent No.: US 12,687,241 B2
(45) Date of Patent: Jul. 21, 2026

(54) ROTARY CONTROL VALVE AND CONTROL METHOD OF ROTARY CONTROL VALVE

(71) Applicant: ZHEJIANG DUNAN ARTIFICIAL ENVIRONMENT CO., LTD., Shaoxing (CN)

(72) Inventors: Yuanhang Yu, Shaoxing (CN); Zhijun Kang, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 33 days.

(21) Appl. No.: 18/873,073

(22) PCT Filed: Jun. 7, 2023

(86) PCT No.: PCT/CN2023/099001
§ 371 (c)(1),
(2) Date: Dec. 9, 2024

(87) PCT Pub. No.: WO2023/237028
PCT Pub. Date: Dec. 14, 2023

(65) Prior Publication Data
US 2025/0314328 A1     Oct. 9, 2025

(30) Foreign Application Priority Data

Jun. 9, 2022   (CN) ........................ 202210647347.X
Jun. 9, 2022   (CN) ........................ 202221441023.2
Jun. 9, 2022   (CN) ........................ 202221474319.4

(51) Int. Cl.
*F16K 37/00*       (2006.01)
*F16K 11/085*      (2006.01)
*F25B 41/26*       (2021.01)

(52) U.S. Cl.
CPC ...... *F16K 37/0041* (2013.01); *F16K 11/0853* (2013.01); *F25B 41/26* (2021.01)

(58) Field of Classification Search
CPC ... F16K 37/0041; F16K 11/0853; F25B 41/26
See application file for complete search history.

(56) References Cited

U.S. PATENT DOCUMENTS 5,287,889 A * 2/1994 Leinen .................. F16K 47/045
                                                            137/625.3
10,914,387 B2 * 2/2021 Helfer ................... F16K 5/0689
                        (Continued)

FOREIGN PATENT DOCUMENTS

CN        110375105 A        10/2019
CN        111365511 A        7/2020
                    (Continued)

OTHER PUBLICATIONS

The EESR of counterpart EP application No. 23819193.6 was issued on Sep. 17, 2025.
(Continued)

*Primary Examiner* — P. Macade Nichols
(74) *Attorney, Agent, or Firm* — Scully, Scott, Murphy & Presser, P.C.

(57)     ABSTRACT

A rotary control valve is provided. The valve includes: a valve body having a valve cavity and a first end and a second end disposed oppositely; a valve core assembly rotatably disposed in the valve cavity; a driving mechanism disposed at the first end of the valve body, having a driving end, being in driving connection with the valve core assembly, and driving the valve core assembly to rotate in the valve cavity through the driving end; a sensing member disposed at the first end and is electrically connected with the driving mechanism; and a sensed member rotatably disposed in the valve cavity and rotating synchronously with the valve core assembly. The sensing member cooperates with the sensed
(Continued)

member in a sensing manner to detect the rotation angle of the valve core assembly.

28 Claims, 12 Drawing Sheets

(56)                References Cited

U.S. PATENT DOCUMENTS

| | | | |
|---|---|---|---|
| 2017/0027807 | A1 | 2/2017 | Waldridge |
| 2017/0254434 | A1* | 9/2017 | Chang .................. F16K 31/042 |

FOREIGN PATENT DOCUMENTS

| | | |
|---|---|---|
| CN | 212131411 U | 12/2020 |
| CN | 212839671 U | 3/2021 |
| CN | 112879600 A | 6/2021 |
| CN | 217736350 U | 11/2022 |
| DE | 102019134949 A1 | 6/2021 |
| EP | 0126007 A1 | 11/1984 |
| JP | 2008178291 A | 7/2008 |
| WO | 2020038470 A1 | 2/2020 |

OTHER PUBLICATIONS

The search report of PCT application No. PCT/CN2023/099001 issue on Sep. 12, 2023.
Office Action of counterpart CN application No. 202210647347.X was issued on Apr. 1, 2026.

* cited by examiner

ROTARY CONTROL VALVE AND CONTROL METHOD OF ROTARY CONTROL VALVE

CROSS-REFERENCE TO RELATED APPLICATIONS

The present disclosure is a national stage disclosure of international Patent Disclosure No. PCT/CN2023/099001, which is filed on Jun. 7, 2023, and claims priority to Chinese Patent Disclosure No. 202221441023.2, entitled "ROTARY CONTROL VALVE" filed with the State Intellectual Property Office of P. R. China on Jun. 9, 2022, Chinese Patent Disclosure No. 202210647347.X, entitled "ROTARY CONTROL VALVE AND CONTROL METHOD OF ROTARY CONTROL VALVE" filed with the State Intellectual Property Office of P. R. China on Jun. 9, 2022 and Chinese Patent Disclosure No. 202221474319.4, entitled "DRIVING MECHANISM MACHINE AND ROTARY CONTROL VALVE PROVIDED WITH DRIVING MECHANISM MACHINE" filed with the State Intellectual Property Office of P. R. China on Jun. 9, 2022, the contents of which are hereby incorporated by reference in its entirety.

TECHNICAL FIELD

The present disclosure relates to the technical field of valves, specifically to a rotary control valve and a control method thereof.

BACKGROUND

An existing rotary control valve usually comprises a valve body, a valve core and a driving mechanism, wherein the valve body has a valve cavity, the valve core is rotatably arranged in the valve cavity, and the driving mechanism is arranged on the valve body and is in driving connection with the valve core to enable the valve core to rotate. The rotary control valve also comprises a first limiting portion and a second limiting portion, the first limiting portion is located inside the valve body and is arranged on an inner end surface of the valve body, the second limiting portion is arranged at one end of the valve core, and the first limiting portion and the second limiting portion abut to each other and are in limiting cooperation to limit the rotation angle of the valve core. However, by using the manner of cooperation between the first limiting portion and the second limiting portion, after long-term use, there may be wear or even damage to the first limiting portion or the second limiting portion, which may affect the normal operation of the rotary control valve.

SUMMARY

Some embodiments of the present disclosure provide a rotary control valve and a control method thereof to solve the problem that the normal operation of a rotary control valve is affected due to damage to a first limiting portion or a second limiting portion in the prior art.

Some embodiments of the present disclosure provide a rotary control valve, comprising: a valve body which has a valve cavity and has a first end and a second end disposed oppositely; a valve core assembly rotatably disposed in the valve cavity; a driving mechanism which is disposed at the first end of the valve body, has a driving end in driving connection with the valve core assembly, and drives the valve core assembly to rotate in the valve cavity by the driving end; a sensing member which is disposed on the valve body and is electrically connected with the driving mechanism; and a sensed member which is rotatably disposed in the valve cavity and rotates synchronously with the valve core assembly, wherein the sensing member cooperates with the sensed member in a sensing manner to detect the rotation angle of the valve core assembly.

By applying the technical solution of the present disclosure, the sensed member rotates synchronously with the valve core assembly, and by the cooperation between the sensing member and the sensed member, during the rotation of the sensed member, the situation of mutual contact between the sensing member and the sensed member can be avoided, thereby avoiding damage to the sensing member and the sensed member due to mutual contact, and ensuring the normal operation of the rotary control valve. Specifically, the driving mechanism drives the valve core assembly to rotate, and the sensed member rotates synchronously with the valve core assembly. After the sensing member senses the sensed member, the sensing member transmits the signal to the driving mechanism, the driving mechanism stops driving the valve core assembly, and the valve core assembly stops rotating. In the traditional technical solution, the rotation angle of the valve core assembly is limited through a limiting assembly disposed between the valve core assembly and the valve body, and the acting force is transmitted between the valve core assembly and the valve body through the limiting assembly, which leads to damage to the limiting assembly. In this solution, the sensing member, the sensed member and the driving mechanism cooperate to limit the rotation angle of the valve core assembly, thereby avoiding damage caused by direct or indirect contact between the sensing member and the sensed member, and ensuring the normal operation of the rotary control valve.

Some embodiments of, the valve core assembly has a third end and a fourth end disposed oppositely, the third end is disposed close to the first end, and the sensed member is disposed on an end surface of the third end. Such arrangement can avoid mutual interference between the sensed member and the valve body during the rotation of the valve core assembly, thereby ensuring the smoothness of the rotation of the valve core assembly.

Some embodiments of, a projection of the sensing member on the third end of the valve core assembly is located on a rotation trajectory of the sensed member. Such arrangement can reduce the distance between the sensing member and the sensed member in the axis direction of the valve body as much as possible, thereby ensuring the sensing accuracy between the sensing member and the sensed member, and further ensuring the accuracy of detecting the rotation angle of the valve core assembly.

Some embodiments of, the end surface of the third end is provided with a limiting structure, and the limiting structure is configured to limit a position of the sensed member. Such arrangement can ensure the position accuracy of mounting of the sensed member.

Some embodiments of, the end surface of the third end is provided with a limiting groove, and the sensed member is disposed in the limiting groove. The limiting groove is simple in structure and convenient to process and form the valve core assembly.

Some embodiments of, an end surface of the sensed member close to the first end of the valve body is flush with the end surface of the third end of the valve core assembly. Such arrangement can avoid mutual interference between the sensed member and the valve body, thereby ensuring the smoothness of the rotation of the valve core assembly.

Some embodiments of, the sensed member is made of a magnetic material, the valve core assembly comprises a body portion and a non-magnetic-conductive portion, the non-magnetic-conductive portion is disposed on the body portion, the driving end is in driving connection with the body portion, and the sensed member is arranged on the non-magnetic-conductive portion. The arrangement of the non-magnetic-conductive portion can reduce the occurrence of magnetic force reduction of the sensed member, thereby ensuring the stability and accuracy of sensing cooperation between the sensing member and the sensed member.

Some embodiments of, an end surface of the body portion close to the first end is provided with a first mounting groove, and the non-magnetic-conductive portion is detachably disposed in the first mounting groove. Such arrangement can facilitate the mounting of the non-magnetic-conductive portion.

Some embodiments of, the valve core assembly comprises a body portion, pressing blocks and sealing members, a side wall of the body portion is provided with a fixing groove, the fixing groove penetrates through both ends of the body portion along an axis direction of the body portion, the sealing member is located in the fixing groove, two pressing blocks are respectively located at both ends of the sealing member, the pressing block is detachably connected with the body portion, and two pressing blocks can cooperate to limit the displacement of the sealing member relative to the body portion in an axial direction. Such arrangement can reduce or avoid internal leakage on high and low pressure sides inside the valve body, thereby ensuring the operation stability of the rotary control valve.

Some embodiments of, the first end is eccentrically provided with a first mounting hole, the first mounting hole penetrates through the first end, internal threads are disposed in the first mounting hole, an outer side wall of the sensing member is provided with external threads, and the sensing member is in threaded connection with the valve body through the first mounting hole. Such arrangement can improve the assembling convenience of the sensing member.

BRIEF DESCRIPTION OF THE DRAWINGS

The accompanying drawings of the specification, constituting a part of the present disclosure, are used for providing a further understanding of the present disclosure. The exemplary embodiments of the present disclosure and the descriptions thereof are used for explaining the present disclosure, and do not constitute an improper limitation on the present disclosure. In the accompanying drawings:

FIG. 5 illustrates a partial schematic structural view of a part B in FIG. 4;

FIG. 8 illustrates a top view of a valve body of the rotary control valve provided in the embodiment 2 of the present disclosure;

FIG. 9 illustrates a schematic structural view of a rotary control valve provided in an embodiment 4 of the present disclosure;

Figure 1:
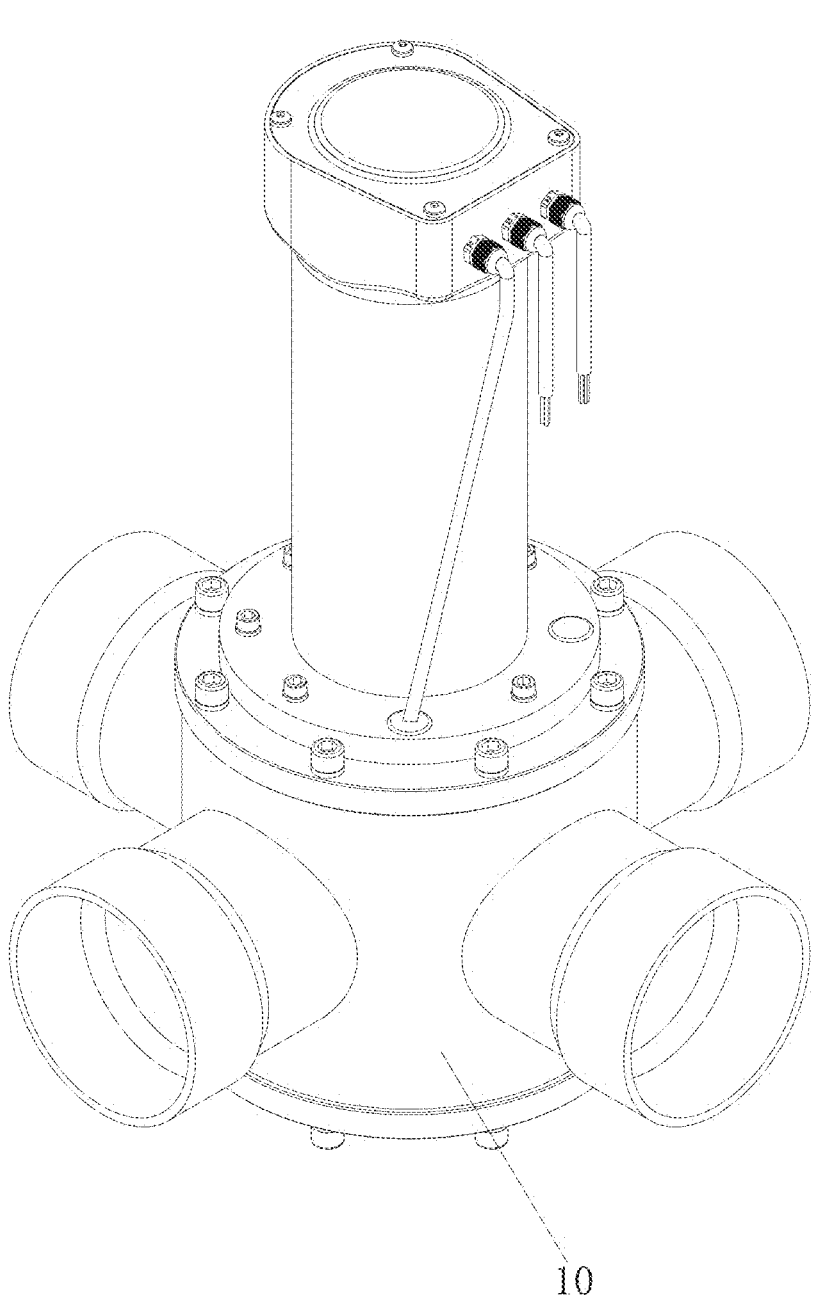
FIG. 1 illustrates a schematic structural view of a rotary control valve provided in an embodiment 1 of the present disclosure.

The above accompanying drawings have the following reference numerals:

10. valve body; 101. valve cavity; 102. first penetration hole; 103. first mounting hole;

104. first circulation hole; 1041. connecting pipe;

20. valve core assembly; 201. limiting groove;

21. body portion; 211. first mounting groove; 212. fixing groove; 22. non-magnetic-conductive portion; 221. first bolt; 23. pressing block; 24. sealing member;

31. driving motor; 32. reducing mechanism; 33. control portion;

40. sensing member;

41. refrigerating sensing member; 42. heating sensing member; 43. return-to-zero sensing member;

50. sensed member;

60. housing; 601. first accommodating cavity; 602. second accommodating cavity;

603. second penetration hole; 604. second mounting hole;

61. cylinder; 62. partition portion; 63. first end cover; 64. second end cover;

71. power wire; 72. signal wire; 73. sensing wire;

80. waterproof portion;

91. first wiring terminal; 92. second wiring terminal; 93. third wiring terminal; 94. fourth wiring terminal.

DETAILED DESCRIPTION OF THE EMBODIMENTS

The technical solutions in the embodiments of the present disclosure are clearly and completely described below with reference to the accompanying drawings in the embodiments of the present disclosure. Obviously, the described embodiments are only some embodiments rather than all the embodiments of the present disclosure. The following description of at least one exemplary embodiment is actually only illustrative, and does not constitute any limitation on the present disclosure and the disclosure or use of the present disclosure. All other embodiments obtained by those of ordinary skill in the art based on the embodiments in the present disclosure without creative efforts shall fall within the scope of protection of the present disclosure.

As shown in FIG. 1 to FIG. 5, an embodiment 1 of the present disclosure provides a rotary control valve which comprises a valve body 10, a valve core assembly 20, a driving mechanism, a sensing member 40 and a sensed member 50, wherein the valve body 10 has a first end and a second end disposed oppositely, the first end of the valve body 10 is an end cover, the valve body 10 has a valve cavity 101 and a first penetration hole 102 communicated with each other, and the first penetration hole 102 is disposed on an end surface of the first end. The valve core assembly 20 is rotatably disposed in the valve cavity 101. The driving mechanism is disposed at the first end of the valve body 10, the driving mechanism has a driving end, the driving end is in driving connection with the valve core assembly 20 through the first penetration hole 102, and the driving mechanism drives the valve core assembly 20 to rotate in the valve cavity 101 by the driving end. The sensing member 40 is disposed at the first end, and the sensing member 40 is electrically connected with the driving mechanism. The sensed member 50 is rotatably disposed in the valve cavity 101, the sensed member 50 rotates synchronously with the valve core assembly 20, and the sensing member 40 cooperates with the sensed member 50 in a sensing manner to detect the rotation angle of the valve core assembly 20.

By applying the technical solution of the present disclosure, the sensed member 50 rotates synchronously with valve core assembly 20, and by the cooperation between the sensing member 40 and the sensed member 50, during the rotation of the sensed member 50, the situation of mutual contact between the sensing member 40 and the sensed member 50 can be avoided, thereby avoiding damage to the sensing member 40 and the sensed member 50 due to mutual contact, and ensuring the normal operation of the rotary control valve. Specifically, the driving mechanism drives the valve core assembly 20 to rotate, and the sensed member 50 rotates synchronously with the valve core assembly 20. After the sensing member 40 senses the sensed member 50, the sensing member 40 transmits the signal to the driving mechanism, the driving mechanism stops driving the valve core assembly 20, and the valve core assembly 20 stops rotating, thereby achieving the positioning and limiting of the rotation of the valve core assembly 20. In the traditional technical solution, the rotation angle of the valve core assembly 20 is limited through a limiting assembly disposed between the valve core assembly 20 and the valve body 10, and the acting force is transmitted between the valve core assembly 20 and the valve body 10 through the limiting assembly, which leads to damage to the limiting assembly. In this solution, the sensing member 40, the sensed member 50 and the driving mechanism cooperate to limit the rotation angle of the valve core assembly 20, thereby avoiding damage caused by direct or indirect contact between the sensing member 40 and the sensed member 50, and ensuring the normal operation of the rotary control valve. Moreover, such arrangement can ensure the compactness of the structure of the rotary control valve.

Figure 2:
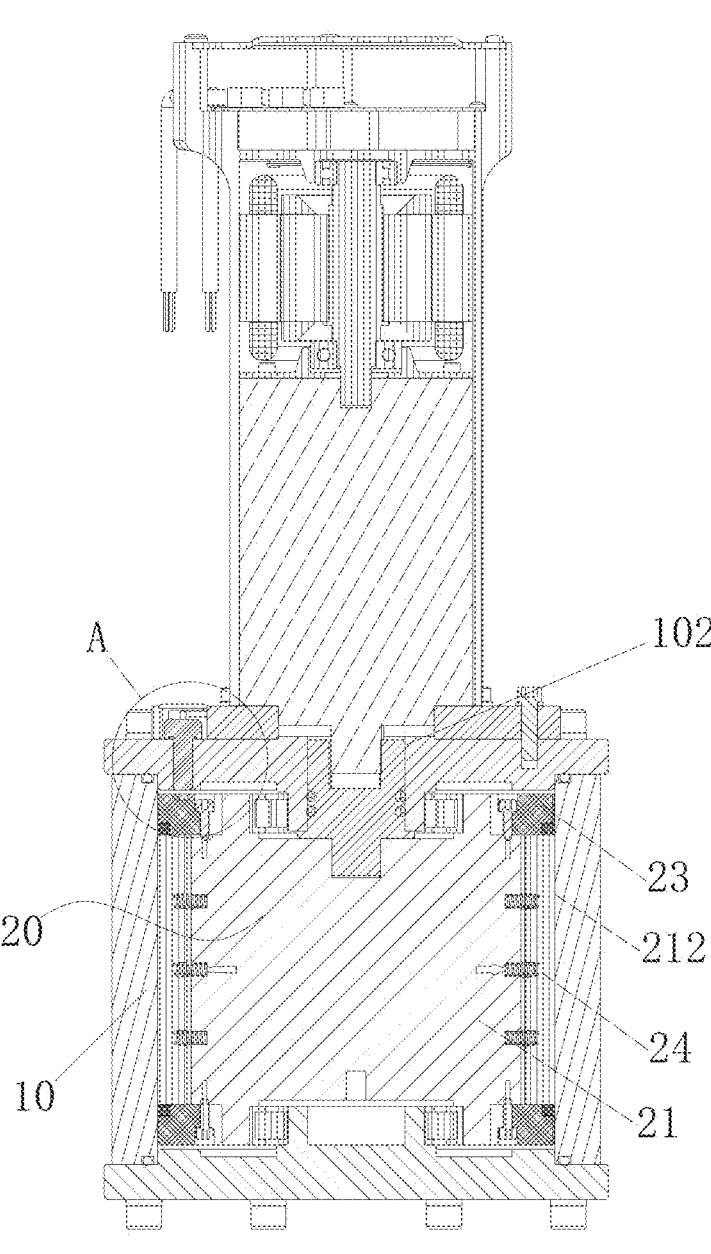
FIG. 2 illustrates a cross-sectional view of the rotary control valve provided in the embodiment 1 of the present disclosure.
Figure 3:
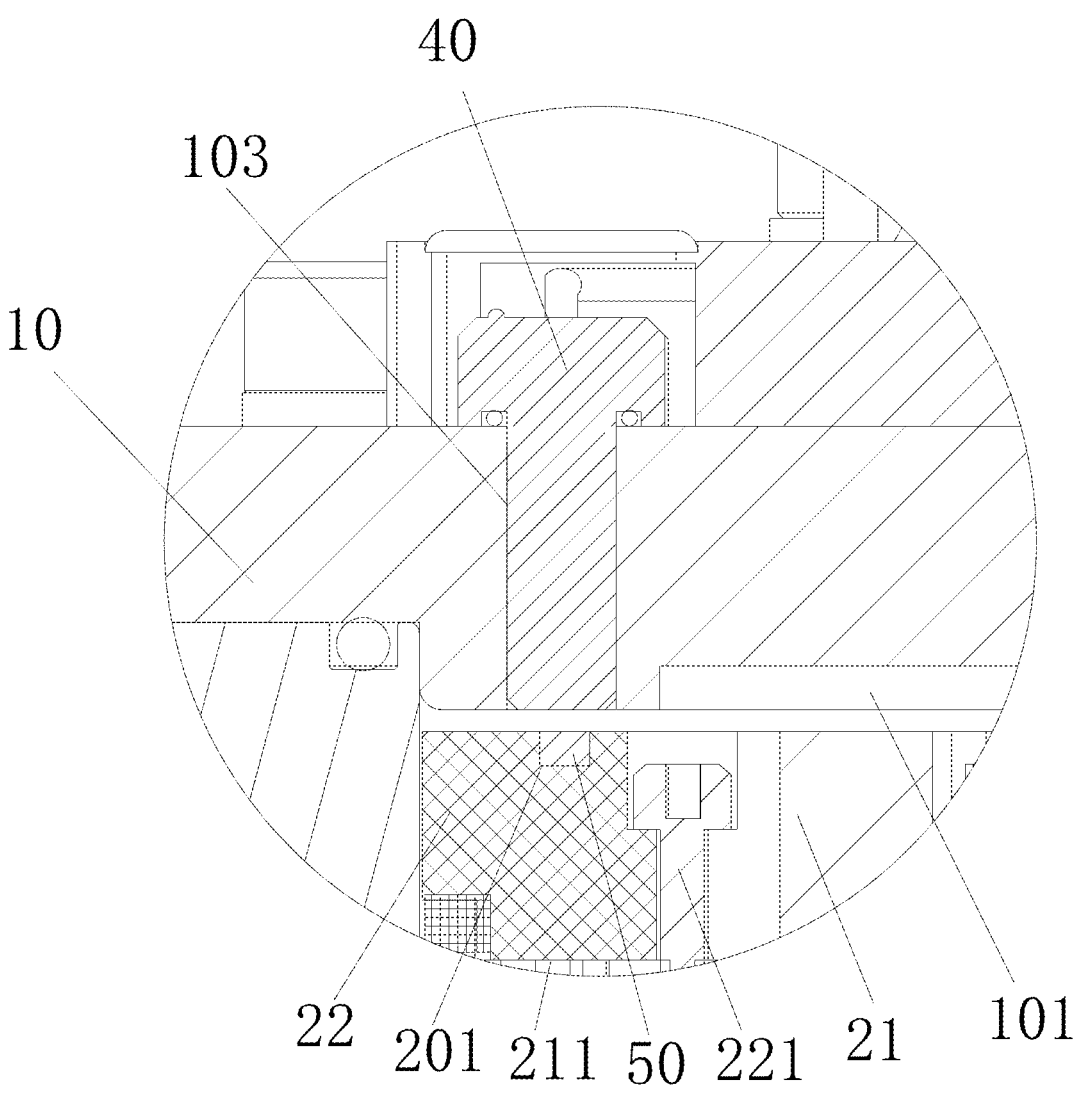
FIG. 3 illustrates a partial schematic structural view of a part A in FIG. 2.

As shown in FIG. 2 and FIG. 3, the valve core assembly 20 has a third end and a fourth end disposed oppositely, the third end is disposed close to the first end, and the sensed member 50 is disposed on an end surface of the third end. Specifically, the first end of the valve body 10 has an inner end surface and an outer end surface disposed oppositely along an axis direction, there is a distance between the end surface of the third end of the valve core assembly 20 and the inner end surface of the valve body 10, and there is a distance between the sensed member 50 and the inner end surface of the valve body. Such arrangement can avoid mutual interference between the sensed member 50 and the valve body 10 during the rotation of the valve core assembly 20, thereby ensuring the smoothness of the rotation of the valve core assembly 20.

Figure 4:
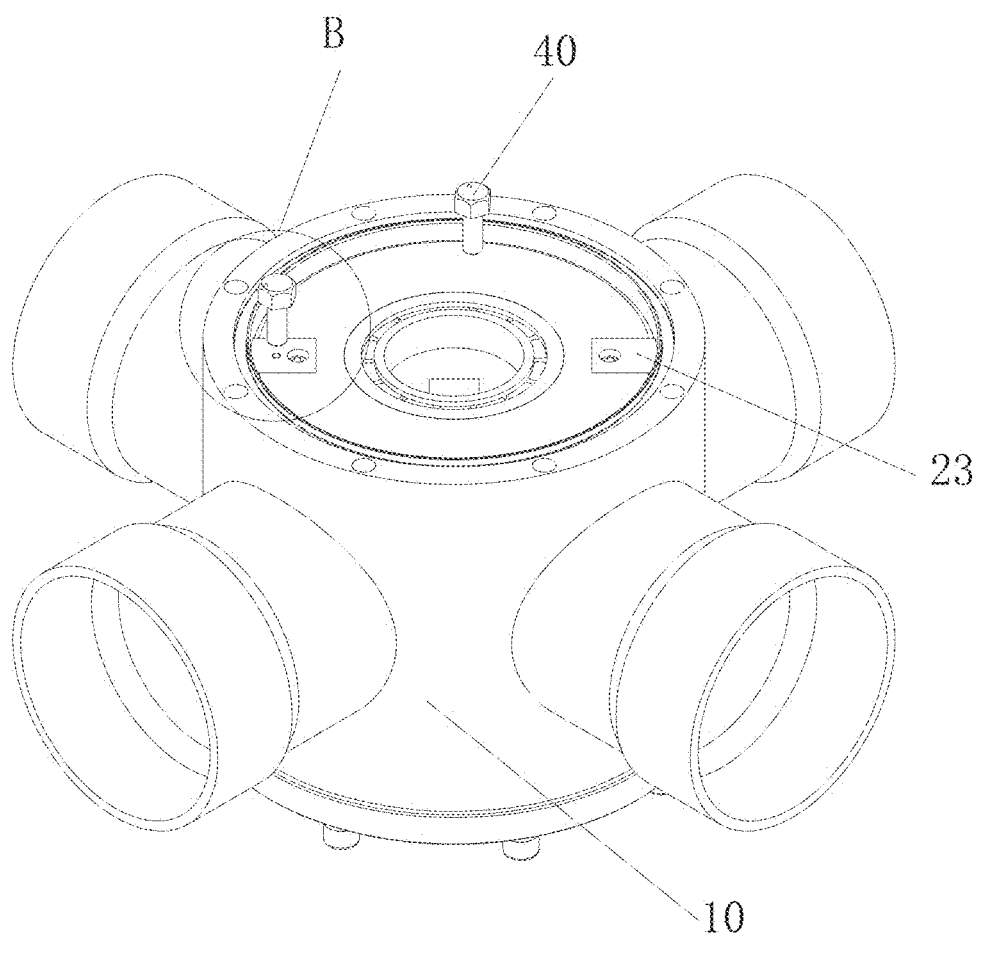
FIG. 4 illustrates a schematic structural view of a valve body provided in the embodiment 1 of the present disclosure.
Figure 5:
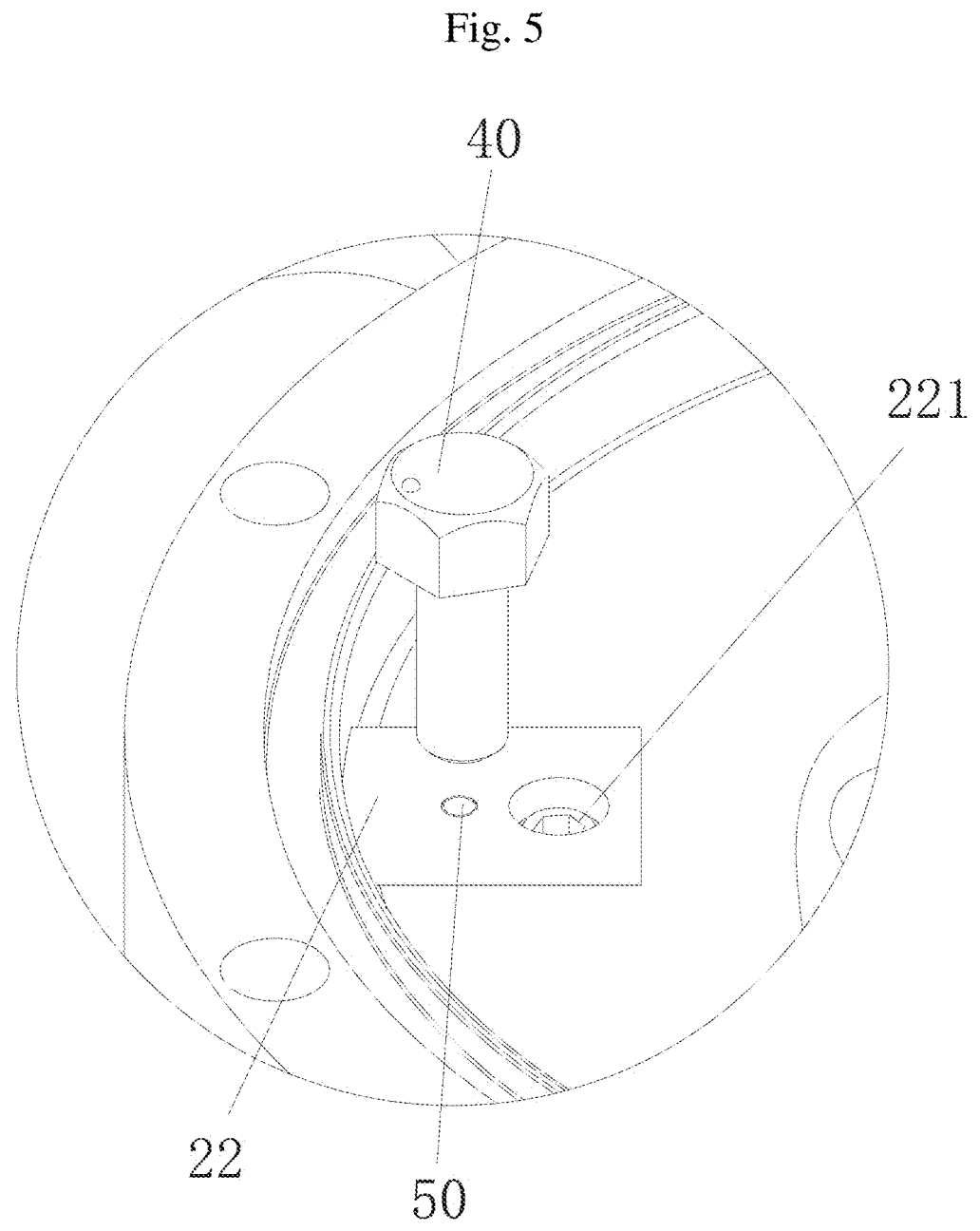

As shown in FIG. 4 and FIG. 5, a projection of the sensing member 40 on the end surface of the third end of the valve core assembly 20 is located on a rotation trajectory of the sensed member 50. Such arrangement can reduce the distance between the sensing member 40 and the sensed member 50 in the axis direction of the valve body 10 as much as possible, thereby ensuring the sensing accuracy between the sensing member 40 and the sensed member 50, and ensuring the accuracy of detecting the rotation angle of the valve core assembly 20. In addition, such arrangement can reduce the axial size of the valve body 10 as much as possible, thereby achieving miniaturization of the rotary control valve. This solution does not limit the structures of the sensing member 40 and the sensed member 50. In this embodiment, the cross sections of the sensing member 40 and the sensed member 50 along the axis direction perpendicular to the valve body 10 are both circular, and the axis of the sensing member 40 can coincide with the axis of the sensed member 50.

Further, the sensed member 50 is detachably connected with the valve core assembly 20. This solution does not limit a specific manner for detachable connection. The sensed member 50 can be detachably connected with the valve core assembly 20 by means of clamping or inserting, or can be connected with the valve core assembly 20 by a fastener.

In this solution, the end surface of the third end is provided with a limiting structure, and the limiting structure is configured to limit a position of the sensed member 50. The arrangement of the limiting structure can ensure the position accuracy of the sensed member 50, thereby ensuring the accuracy of sensing cooperation between the sensing member 40 and the sensed member 50.

As shown in FIG. 2 to FIG. 5, the end surface of the third end is provided with a limiting groove 201, and the sensed member 50 is disposed in the limiting groove 201. Moreover, in this solution, the sensed member 50 is connected with the valve core assembly 20 by means of bonding. Such arrangement can ensure the assembling convenience of the sensed member 50 and the valve core assembly 20.

Further, an end surface of the sensed member 50 close to the first end of the valve body 10 is flush with the end surface of the third end of the valve core assembly 20. The sensing range of the sensing member 40 is limited. The above arrangement can avoid the situation that an end portion of the third end of the valve core assembly 20 blocks the sensed member 50, thereby ensuring that the sensing member 40 can sense the position of the sensed member 50 in time, and ensuring the accuracy of detecting the rotation angle of the valve core assembly 20.

Specifically, the sensed member 50 is made of a magnetic material, the valve core assembly 20 comprises a body portion 21 and a non-magnetic-conductive portion 22, the driving end is in driving connection with the body portion 21, the non-magnetic-conductive portion 22 is disposed on the body portion 21, and the sensed member 50 is arranged on the non-magnetic-conductive portion 22. The arrangement of the non-magnetic-conductive portion 22 can ensure the sensing accuracy of the sensing member 40, thereby ensuring the accuracy of detecting the rotation angle of the valve core assembly 20.

Specifically, an end surface of the body portion 21 close to the first end is provided with a first mounting groove 211, and the non-magnetic-conductive portion 22 is detachably disposed in the first mounting groove 211. In this embodiment, the end surface of the non-magnetic-conductive portion 22 close to the first end and the end surface of the body portion 21 close to the first end are located on the same horizontal plane, and form the end surface of the third end. The arrangement of the first mounting groove 211 can play a positioning role in the mounting of the non-magnetic-conductive portion 22, thereby ensuring the accuracy and convenience of the mounting of the non-magnetic-conductive portion 22.

The non-magnetic-conductive portion 22 can be detachably connected with the body portion 21 by means of clamping, inserting or bonding. In this embodiment, the rotary control valve also comprises a first bolt 221, the non-magnetic-conductive portion 22 is provided with a first countersunk hole, and the first bolt 221 penetrates in the first countersunk hole and is in threaded connection with the body portion 21. Such arrangement can ensure the convenience of connection between the non-magnetic-conductive portion 22 and the body portion 21, and can avoid mutual interference between the first bolt 221 and the valve body 10, thereby ensuring the smoothness of the rotation of the valve core assembly 20.

As shown in FIG. 2 and FIG. 3, the valve core assembly 20 also comprises pressing blocks 23 and sealing member 24, a side wall of the body portion 21 is provided with a fixing groove 212, the fixing groove 212 penetrates through both ends of the body portion 21 along an axis direction of the body portion 21, the sealing member 24 is located in the fixing groove 212, two pressing blocks 23 are respectively located at both ends of the sealing member 24, the pressing block 23 is detachably connected with the body portion 21, and two pressing blocks 23 can cooperate to limit the displacement of the sealing member 24 relative to the body portion 21 in the axial direction of the body portion 21, wherein the sealing member 24 and two pressing blocks 23 located at both ends of the sealing member 24 form a sealing structure. In this embodiment, two groups of sealing structures are disposed at intervals along a circumferential direction of the body portion 21. Moreover, an end of one of the fixing grooves 212 close to the first end of the valve body 10 forms the first mounting groove 211, and the pressing block 23 disposed in the first mounting groove 211 is made of a non-magnetic-conductive material and forms a non-magnetic-conductive portion 22. By such arrangement, the non-magnetic-conductive portion 22 can not only cooperate with the sealing member 24, but also cooperate with the sensed member 50, thereby reducing parts of the rotary control valve, ensuring the structural stability of the valve core assembly 20, and ensuring the assembling convenience of the rotary control valve. This solution does not limit a manner for detachable connection between another three pressing blocks 23 and the body portion 21. In this embodiment, another three pressing blocks 23 are provided with three second countersunk holes respectively, the rotary control valve also comprises three second bolts, the second bolts and the second countersunk holes are disposed in a one-to-one correspondence manner, and another three pressing blocks 23 are connected with the body portion 21 respectively through the three second bolts. Such arrangement can ensure the assembling convenience of the rotary control valve.

As shown in FIG. 2 and FIG. 3, the end surface of the first end is eccentrically provided with a first mounting hole 103, the first mounting hole 103 penetrates through the first end, internal threads are disposed in the first mounting hole 103, an outer side wall of the sensing member 40 is provided with external threads, and the sensing member 40 is in threaded connection with the valve body 10 through the first mounting hole 103. Such arrangement can ensure the assembling convenience of the sensing member 40. In this embodiment, an end surface of an end of the sensing member 40 close to the valve core assembly 20 is flush with an inner end surface of the first end. Such arrangement can ensure the accuracy of position sensing of the sensing member 40 to the sensed member 50, thereby ensuring the accuracy of detecting the rotation angle of the valve core assembly 20. Moreover, such arrangement can avoid interference between the sensing member 40 and the valve core assembly 20, thereby ensuring the smoothness of the rotation of the valve core assembly 20. This solution does not limit the number of sensing members 40. In this embodiment, two sensing members 40 are arranged at an interval along a circumferential direction of the valve body 10.

Figure 6:
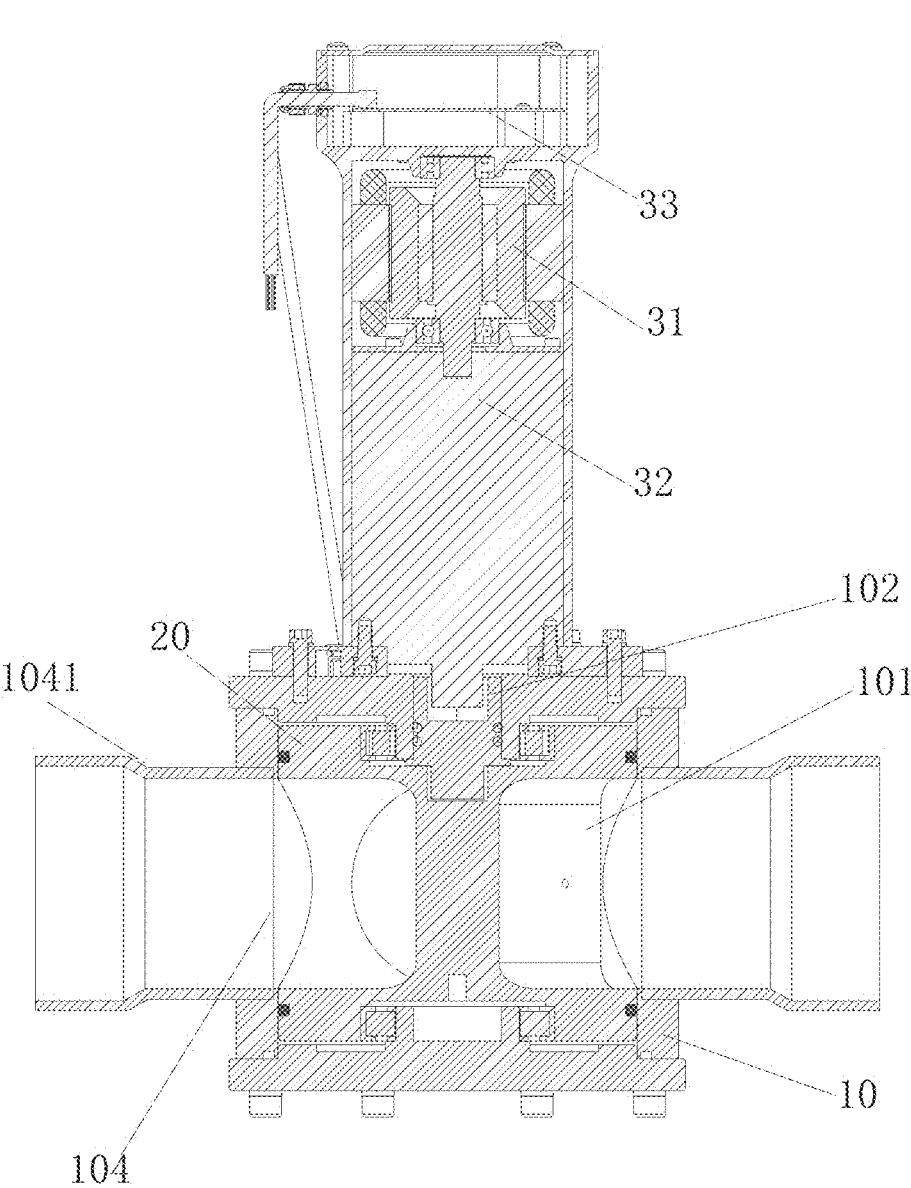
FIG. 6 illustrates a cross-sectional view of a rotary control valve provided in an embodiment 2 of the present disclosure.
Figure 7:
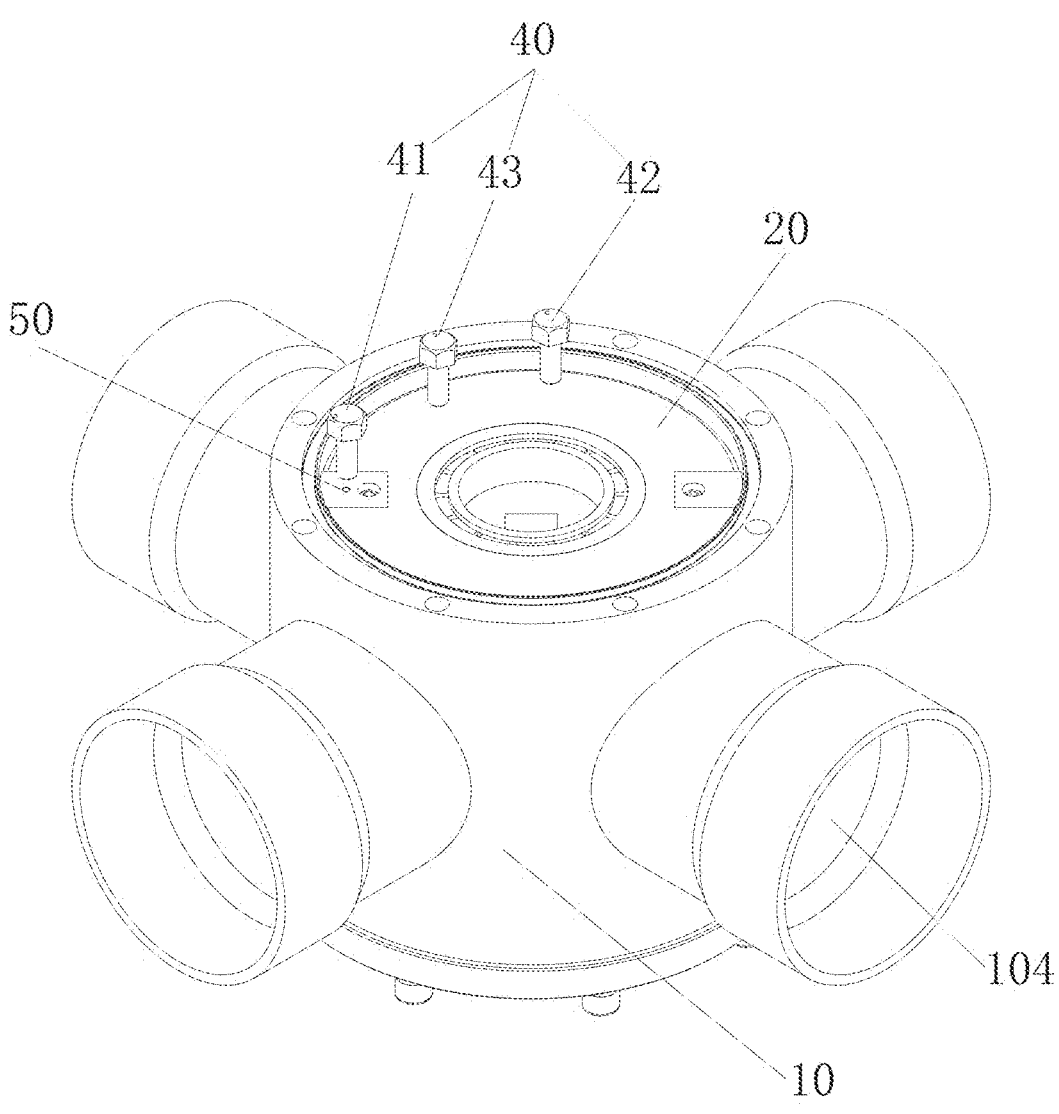
FIG. 7 illustrates a partial schematic structural view of the rotary control valve provided in the embodiment 2 of the present disclosure.
Figure 8:
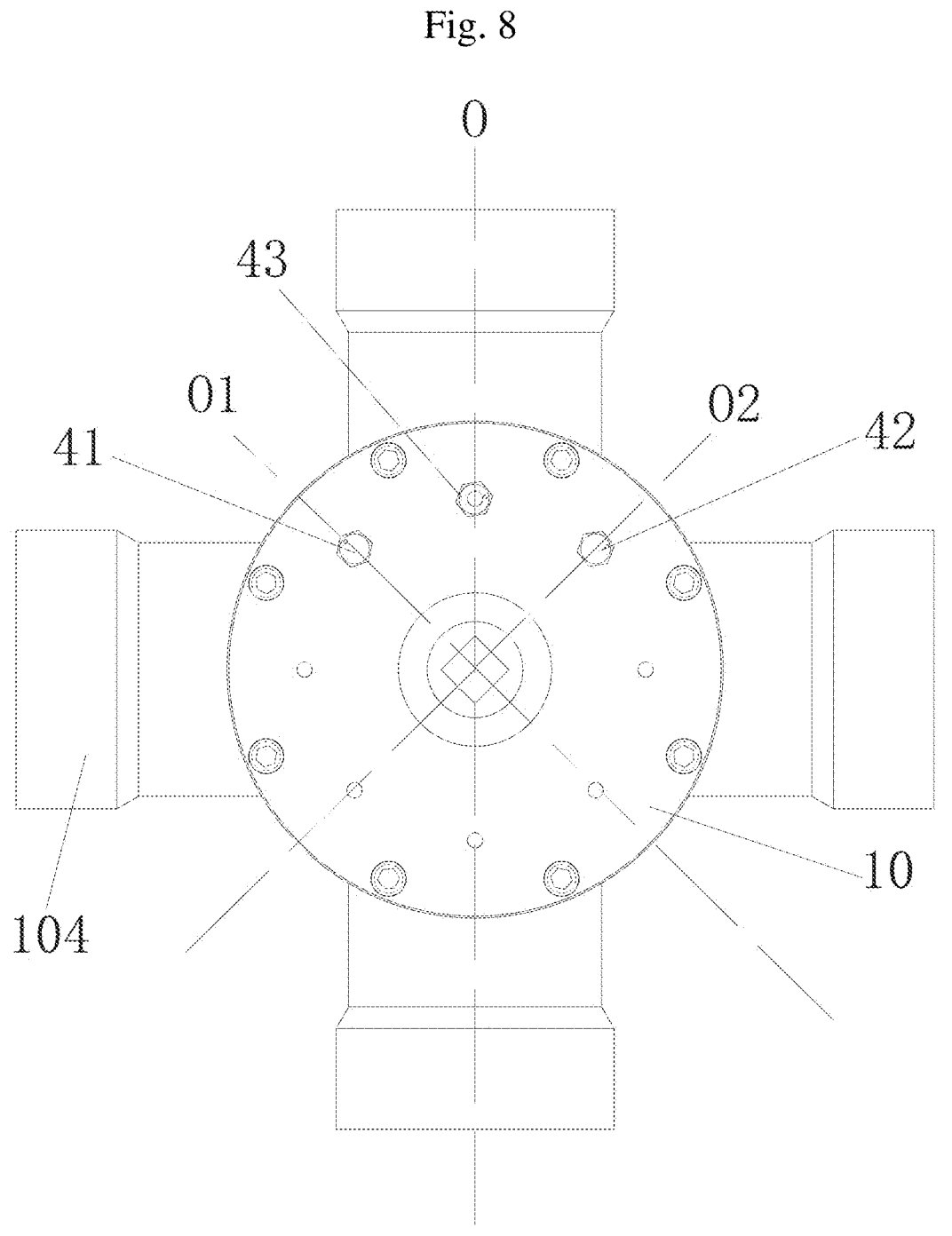

As shown in FIG. 6 to FIG. 8, an embodiment 2 of the present disclosure provides a rotary control valve which comprises a valve body 10, a valve core assembly 20, a driving mechanism, a sensing member 40 and a sensed member 50, wherein the valve body 10 has a valve cavity 101, a first penetration hole 102 and a plurality of first circulation holes 104, which are communicated with each other, the plurality of first circulation holes 104 are disposed on a side wall of the valve body 10 and are connected with a connecting pipe 1041 respectively, and the connecting pipe 1041 is communicated with the valve cavity 101. The rotary control valve has a refrigerating state and a heating state set relatively, the valve core assembly 20 is rotatably disposed in the valve cavity 101, and the valve core assembly 20 can control the communicated state between the plurality of first circulation holes 104 to switch the rotary control valve between the refrigerating state and the heating state. The valve body 10 is provided with a first penetration hole 102, the first penetration hole 102 is communicated with the valve cavity 101, the driving mechanism is disposed on the valve body 10, and the driving mechanism comprises a driving motor 31, a reducing mechanism 32 and a control portion 33, wherein the control portion 33 is electrically connected with the driving motor 31, the driving motor 31 is electrically connected with the reducing mechanism 32, the reducing mechanism 32 has a driving end, the driving end penetrates through the first penetration hole 102 and is in driving connection with the valve core assembly 20, and the driving mechanism drives the valve core assembly 20 to rotate in the valve cavity 101 through the driving end. The sensing member 40 comprises a refrigerating sensing member 41 and a heating sensing member 42, the refrigerating sensing member 41 and the heating sensing member 42 are both disposed on the valve body 10, the refrigerating sensing member 41 and the heating sensing member 42 are distributed at an interval along a circumferential direction of the valve body 10, and the refrigerating sensing member 41 and the heating sensing member 42 are electrically connected with the control portion 33 respectively. The sensed member 50 is rotatably disposed in the valve cavity 101, and the sensed member 50 rotates synchronously with the valve core assembly 20. The refrigerating sensing member 41 and the heating sensing member 42 are located on the same circumference, a first arc segment and a second arc segment are formed between the refrigerating sensing member 41 and the heating sensing member 42, and an arc length of the first arc segment is smaller than the arc length of the second arc segment. When the sensed member 50 is located in a sensing position of the refrigerating sensing member 41, the rotary control valve is in the refrigerating state. When the sensed member 50 is located in a sensing position of the heating sensing member 42, the rotary control valve is in the heating state.

By applying the technical solution of the present disclosure, the refrigerating sensing member 41, the heating sensing member 42 and the sensed member 50 can cooperate with the driving mechanism to control the rotation position of the valve core assembly 20, thereby controlling the communicated state between the plurality of first circulation holes 104. Compared with the traditional technical solution of controlling the rotation position of the valve core assembly 20 through an anti-rotation assembly, this solution can avoid mutual contact between parts, thereby avoiding damage to various parts due to mutual contact, and ensuring the operation stability of the rotary control valve. Specifically, when the valve core assembly 20 drives the sensed member 50 to rotate to the sensing position of the refrigerating sensing member 41, the refrigerating sensing member 41 senses the position information of the sensed member 50 and transmits the position information to the control portion 33 of the driving mechanism, the control portion 33 controls the driving end of the driving mechanism to stop rotating, and thus, the rotary control valve is in the refrigerating state; and when the valve core assembly 20 drives the sensed member 50 to rotate to the sensing position of the heating sensing member 42, the heating sensing member 42 senses the position information of the sensed member 50 and transmits the position information to the control portion 33 of the driving mechanism, the control portion 33 controls the driving end of the driving mechanism to stop rotating, and thus, the rotary control valve is in the heating state. Compared with the traditional technology, the acting force is not transmitted between the valve body 10 and the valve core assembly 20 through the anti-rotation assembly, thereby avoiding the occurrence of cracks or damage to the valve body 10 or the valve core assembly 20 after long-term use, ensuring the structural strength of the valve body 10 and the valve core assembly 20, and further ensuring the normal operation of the rotary control valve. Moreover, the refrigerating sensing member 41, the heating sensing member 42 and the sensed member 50 are simple in structure and easy to assemble with the valve body 10 and the valve core assembly 20.

The valve body 10 has a first end and a second end disposed oppositely, the refrigerating sensing member 41 and the heating sensing member 42 are both disposed on an end surface of the first end, the first penetration hole 102 is disposed on the end surface of the first end and is used for the driving end of the driving mechanism to penetrate through, and the sensed member 50 is disposed on an end surface of the valve core assembly 20 close to the first end. In this solution, the refrigerating sensing member 41 and the heating sensing member 42 are distributed at an interval along a circumferential direction of the valve body 10, and a distance between the refrigerating sensing member 41 and the axis of the valve body 10, a distance between the heating sensing member 42 and the axis of the valve body 10, and a distance between the sensed member 50 and the axis of the valve body 10 are equal. By such arrangement, when the sensed member 50 rotates to the sensing position corresponding to the refrigerating sensing member 41, it can be ensured that a distance between the sensed member 50 and the refrigerating sensing member 41 is small enough; and similarly, when the sensed member 50 rotates to the sensing position corresponding to the heating sensing member 42, it can be ensured that a distance between the sensed member 50 and the heating sensing member 42 is small enough, thereby ensuring the accuracy of sensing cooperation between the refrigerating sensing member 41 and the sensed member 50, and ensuring the accuracy of sensing cooperation between the heating sensing member 42 and the sensed member 50.

In this solution, four first circulation holes 104 are provided, the four first circulation holes 104 are disposed at intervals on a circumferential surface of the valve body 10 along a circumferential direction, an interval area is formed between two adjacent first circulation holes 104, the refrigerating sensing member 41 is located in one of the interval areas, and the heating sensing member 42 is correspondingly located in another adjacent interval area. Specifically, an end of the valve body 10 is provided with a first mounting hole and a second mounting hole, the first mounting hole and the second mounting hole are both communicated with the valve cavity 101, the refrigerating sensing member 41 penetrates in the first mounting hole, and the heating sensing member 42 penetrates in the second mounting hole. An end surface of the valve core assembly 20 close to the first end of the valve body 10 is provided with a second mounting groove, and the sensed member 50 is arranged in the second mounting groove by bonding. Such arrangement can enable both the first mounting hole and the second mounting hole to form avoiding arrangement with the first circulation hole 104 so as to enable both the refrigerating sensing member 41 and the heating sensing member 42 to form avoiding arrangement with the first circulation hole 104, thereby ensuring the rationality of the structural design of the valve body 10, and ensuring the smoothness of the rotary control valve switched between the refrigerating state and the heating state. Moreover, the sensed member 50 and the first circulation hole 104 form avoiding arrangement, thereby ensuring that the fluid does not generate direct impact on the sensed member 50 in the refrigerating state and the heating state, and ensuring the firmness of connection between the sensed member 50 and the valve core assembly 20.

As shown in FIG. 6 and FIG. 8, the first circulation hole 104 between the refrigerating sensing member 41 and the heating sensing member 42 has a center line O, an extension direction of the first center line O is the same as an axis direction of the first circulation hole 104, and the refrigerating sensing member 41 and the heating sensing member 42 are symmetrically disposed relative to the center line O. Moreover, the valve body 10 has a first center line O1 extending along a radial direction of the valve body 10, a projection of the refrigerating sensing member 41 in an axis direction of the valve body 10 is located on the first center line O1, and connecting pipes 1041 located on both sides of the refrigerating sensing member 41 are symmetrically disposed along the first center line O1. The valve body 10 has a second center line O2 extending along the radial direction of the valve body 10, a projection of the heating sensing member 42 in the axis direction of the valve body 10 is located on the second center line O2, and connecting pipes 1041 located on both sides of the heating sensing member 42 are symmetrically disposed along the second center line O2. Specifically, in FIG. 8, the dashed line O is the center line, the dashed line O1 is the first center line, and the dashed line O2 is the second center line. Such arrangement can ensure the smoothness of flow of the fluid in the refrigerating state and the heating state, and can ensure the accuracy of the rotary control valve switched between the refrigerating state and the heating state.

As shown in FIG. 6 to FIG. 8, the rotary control valve also comprises a return-to-zero sensing member 43, the return-to-zero sensing member 43 is disposed on the valve body 10, the return-to-zero sensing member 43 is electrically connected with the control portion 33 of the driving mechanism, the return-to-zero sensing member 43 cooperates with the sensed member 50 in a sensing manner, and the refrigerating sensing member 41, the return-to-zero sensing member 43 and the heating sensing member 42 are distributed at intervals along a circumferential direction of the valve body 10. After the rotary control valve suddenly loses power and is closed, the driving end of the driving mechanism will drive the valve core assembly 20 to rotate under the action of inertia, and then, a position where the valve core assembly 20 stops is not determined, therefore, a position where the sensed member 50 stops is also not determined. By the arrangement of the return-to-zero sensing member 43, every time the rotary control valve is started, the driving mechanism drives the valve core assembly 20 to rotate, the valve core assembly 20 drives the sensed member 50 to rotate until the sensed member 50 rotates to the position of the return-to-zero sensing member 43, and then, the sensed member 50 rotates to a target sensing position according to refrigerating or heating requirements. Due to the possibility of an undetermined rotation direction of the valve core assembly 20 every time the rotary control valve is started, every time the rotary control valve is started, there is a situation that a position where the sensed member 50 stops for the first time is different from a target stop position. By the arrangement of the return-to-zero sensing member 43, it can be ensured that every time the rotary control valve is started, the sensed member 50 is located in a determined position, and then, the sensed member 50 rotates to the sensing position corresponding to the refrigerating sensing member 41 or the sensing position corresponding to the heating sensing member 42 according to usage requirements, thereby improving the smoothness of starting the rotary control valve.

Further, a projection of the return-to-zero sensing member 43 in the axis direction of the valve body 10 is located on the first arc segment, and a distance between the return-to-zero sensing member 43 and the refrigerating sensing member 41 is equal to a distance between the return-to-zero sensing member 43 and the heating sensing member 42. By such arrangement, after the rotary control valve is started, the position where the sensed member 50 stops for the first time is on the first arc segment; and then, when the sensed member 50 rotates again, the rotation route of the sensed member 50 is half of the arc length of the first arc segment. Such arrangement can reduce the starting time of the rotary control valve as much as possible.

An embodiment 3 of the present disclosure provides a control method of a rotary control valve. The control method is suitable for the rotary control valve according to the above embodiment 2. The control method comprises: step 1: starting the rotary control valve, acquiring a starting position of the sensed member 50 of the rotary control valve, and judging whether the starting position is located in the sensing position of the refrigerating sensing member 41 or the heating sensing member 42 of the rotary control valve; and step 2: if the starting position is located in the sensing position of the refrigerating sensing member 41 or the heating sensing member 42, controlling the valve core assembly 20 and the sensed member 50 of the rotary control valve to rotate through the driving mechanism of the rotary control valve, and enabling the sensed member 50 to rotate in a projection area of the first arc segment to switch the rotary control valve between the refrigerating state and the heating state.

By adopting the above technical solution, it can be ensured that the time required for switching the rotary control valve between the refrigerating state and the heating state is as short as possible, thereby ensuring the rapidity of starting the rotary control valve, and ensuring the rapidity of switching between the refrigerating state and the heating state.

This solution does not limit the distribution direction of the refrigerating sensing member 41 and the heating sensing member 42, wherein the refrigerating sensing member 41 and the heating sensing member 42 can be distributed along a clockwise direction or distributed along a counterclockwise direction.

When the refrigerating sensing member 41 and the heating sensing member 42 are distributed along the clockwise direction and the rotary control valve needs to be in the refrigerating state:

first, the rotary control valve is started, the starting position of the sensed member 50 is acquired, and whether the starting position is located in the sensing position of the refrigerating sensing member 41 or the heating sensing member 42 is judged;

if the starting position is located in the sensing position of the refrigerating sensing member 41, the driving mechanism stops driving, and thus, the sensed member 50 is located in the sensing position corresponding to the refrigerating sensing member 41;

if the starting position is located in the sensing position of the heating sensing member 42, the driving mechanism drives the valve core assembly 20 to drive the sensed member 50 to rotate counterclockwise in the projection area of the first arc segment until the sensed member 50 rotates to the sensing position of the refrigerating sensing member 41, the driving mechanism stops driving the valve core assembly 20 to rotate, and thus, the rotary control valve is in the refrigerating state; after the rotary control valve is closed normally, the principle of a heating method of the rotary control valve during starting of the rotary control valve is the same as above; and then, when switching between the heating state and the refrigerating state is required, the driving mechanism drives the sensed member 50 to rotate in the projection area of the first arc segment, so as to switch the rotary control valve between the refrigerating state and the heating state.

Further, the control method also comprises: step 3: if the starting position is not located in the sensing position of the refrigerating sensing member 41 or the heating sensing member 42, driving the sensed member 50 to rotate through the driving mechanism; when the sensed member 50 rotates to the sensing position of the refrigerating sensing member 41 or the heating sensing member 42, judging whether the sensing position is a target position; if the sensing position is the target position, enabling the driving mechanism to stop working; and if the sensing position is not the target position, controlling the valve core assembly 20 and the sensed member 50 to rotate oppositely through the driving mechanism to enable the sensed member 50 to rotate to the next sensing position.

During the use of the rotary control valve, there is sudden power outage and other abnormal closure situations. In this case, the sensed member 50 is not stop in the sensing position of the refrigerating sensing member 41 or the heating sensing member 42. After restarting, the starting position of the sensed member 50 will not stop in the sensing position of the refrigerating sensing member 41 or the heating sensing member 42. The above arrangement can ensure the normal starting of the rotary control valve in the case of abnormal closure.

Specifically, when the refrigerating sensing member 41 and the heating sensing member 42 are distributed along a clockwise direction and the projection of the sensed member 50 in the axis direction of the valve body 10 is located on the first arc segment, during refrigerating of the rotary control valve, the rotary control valve is started; if the driving mechanism drives the sensed member 50 to rotate counterclockwise, when the sensed member 50 rotates to the sensing position of the refrigerating sensing member 41, the driving mechanism stops working; and if the driving mechanism drives the sensed member 50 to rotate clockwise, when the sensed member 50 rotates to the sensing position of the heating sensing member 42, the driving mechanism drives the sensed member 50 to rotate oppositely until the sensed member 50 rotates to the sensing position of the refrigerating sensing member 41. After the rotary control valve is closed abnormally, when the projection of the sensed member 50 in the axis direction of the valve body 10 is located on the first arc segment, the principle of a heating method of the rotary control valve during starting of the rotary control valve is the same as above.

Alternatively, when the refrigerating sensing member 41 and the heating sensing member 42 are distributed along a clockwise direction and the projection of the sensed member 50 in the axis direction of the valve body 10 is located on the second arc segment, during refrigerating of the rotary control valve, the rotary control valve is started; if the driving mechanism drives the sensed member 50 to rotate clockwise, when the sensed member 50 rotates to the sensing position of the refrigerating sensing member 41, the driving mechanism stops working; and if the driving mechanism drives the sensed member 50 to move counterclockwise, when the sensed member 50 rotates to the sensing position of the heating sensing member 42, the driving mechanism drives the sensed member 50 to rotate oppositely until the sensed member 50 rotates to the sensing position of the refrigerating sensing member 41. After the rotary control valve is closed abnormally, when the projection of the sensed member 50 in the axis direction of the valve body 10 is located on the second arc segment, the principle of a heating method of the rotary control valve during starting of the rotary control valve is the same as above.

Further, the control method also comprises: step 4: if the starting position is not located in the sensing position of the refrigerating sensing member 41 or the heating sensing member 42, driving the sensed member 50 to rotate to the sensing position of the return-to-zero sensing member 43 of the rotary control valve through the driving mechanism of the rotary control valve, and then, driving the sensed member 50 to rotate to a target position through the driving mechanism. In the case of abnormal closure of the rotary control valve, after the rotary control valve is started, the driving mechanism first drives the sensed member 50 to rotate to a sensing position of the return-to-zero sensing member 43, and then drives the sensed member 50 to rotate to the target position in the projection area of the first arc segment. By such arrangement, it can be ensured that after the rotary control valve is closed abnormally, when the rotary control valve is started, the projection of the sensed member 50 in the axis direction of the valve body 10 is located on the first arc segment, thereby ensuring that when the rotary control valve is switched between the refrigerating state and the heating state, the sensed member 50 rotates in the projection area of the first arc segment to achieve rapid starting and reach the target position.

Specifically, when the refrigerating sensing member 41 and the heating sensing member 42 are distributed along a clockwise direction and the projection of the sensed member 50 in the axis direction of the valve body 10 is located on the first arc segment, during refrigerating of the rotary control valve, the rotary control valve is started, the driving mechanism drives the sensed member 50 to rotate to the sensing position of the return-to-zero sensing member 43, and then, the driving mechanism rotates counterclockwise until the sensed member 50 rotates to the sensing position of the refrigerating sensing member 41. After the rotary control valve is closed abnormally, when the projection of the sensed member 50 in the axis direction of the valve body 10 is located on the first arc segment, the principle of a heating method of the rotary control valve during starting of the rotary control valve is the same as above.

Alternatively, when the refrigerating sensing member 41 and the heating sensing member 42 are distributed along a clockwise direction and the projection of the sensed member 50 in the axis direction of the valve body 10 is located on the second arc segment, during refrigerating of the rotary control valve, the rotary control valve is started, the driving mechanism drives the sensed member 50 to rotate to the sensing position of the return-to-zero sensing member 43, and then, the driving mechanism rotates counterclockwise until the sensed member 50 rotates to the sensing position of the refrigerating sensing member 41. After the rotary control valve is closed abnormally, when the projection of the sensed member 50 in the axis direction of the valve body 10 is located on the first arc segment, the principle of a heating method of the rotary control valve during starting of the rotary control valve is the same as above.

Of course, in other embodiments, in the case of sudden power outage of the rotary control valve, after being powered on, the rotary control valve can restore to a default state, and then, the sensed member 50 rotates to a target sensing position according to refrigerating or heating requirements. For example, the default state is the refrigerating state. When the driving mechanism drives the valve core assembly 20 to rotate until the sensed member 50 is detected by the refrigerating sensing member 41, the driving mechanism stops driving and then selects the driving according to refrigerating or heating requirements.

As shown in FIG. 9 to FIG. 12, an embodiment 4 of the present disclosure provides a rotary control valve, comprising a driving mechanism. The driving mechanism comprises a housing 60, a control portion 33, a driving portion, a cable structure and a waterproof portion 80, wherein the housing 60 has a first accommodating cavity 601 and a second accommodating cavity 602 arranged at an interval, and the first accommodating cavity 601 and the second accommodating cavity 602 are distributed along an axis direction of the housing 60; the housing 60 is also provided with a second penetration hole 603, the second penetration hole 603 is disposed at an end of the housing 60, and the second penetration hole 603 is communicated with the first accommodating cavity 601; the housing 60 is also provided with a second mounting hole 604, the second mounting hole 604 is disposed on the housing 60 opposite to the second accommodating cavity 602, and the second mounting hole 604 is communicated with the second accommodating cavity 602; the control portion 33 is disposed in the second accommodating cavity 602; the driving portion is disposed in the first accommodating cavity 601, the driving portion has a driving end, the driving end penetrates through the second penetration hole 603 and extends out of the housing 60, and the control portion 33 is electrically connected to the driving portion; an end of the cable structure extends into the second accommodating cavity 602 through the second mounting hole 604 and is connected with the control portion 33; and the waterproof portion 80 is provided with a threading hole for the cable structure to penetrate through, the waterproof portion 80 sleeves the periphery of the cable structure, and the waterproof portion 80 is disposed in the second mounting hole 604.

By applying the technical solution of the present disclosure, the waterproof portion 80 is disposed between the second mounting hole 604 and the cable structure to reduce the situation that external water enters an inside of the second accommodating cavity 602 through a gap between the second mounting hole 604 and the cable structure, thereby reducing the situation of damage to the control portion 33 due to the contact between the control portion 33 and water. Specifically, the waterproof portion 80 is disposed in the second mounting hole 604, and the waterproof portion 80 sleeves the periphery of the cable structure. Compared with the traditional technical solution, the arrangement of the waterproof portion 80 can reduce the situation that external water enters the inside of the housing 60, thereby reducing the occurrence of moisture or short circuits of parts inside the housing 60, and ensuring the working stability of the rotary control valve. Moreover, by the arrangement of this solution, the cable structure directly extends into the second accommodating cavity 602 through the waterproof portion 80 and is directly connected with the control portion 33. Such arrangement can prevent the cable structure from extending into the first accommodating cavity 601, thereby ensuring the rationality of layout of circuits and parts inside the housing 60. Moreover, the control portion 33 and the driving portion are respectively located inside the second accommodating cavity 602 and the first accommodating cavity 601 which are disposed at an interval, thereby ensuring the assembling convenience of the driving mechanism.

Figure 9:
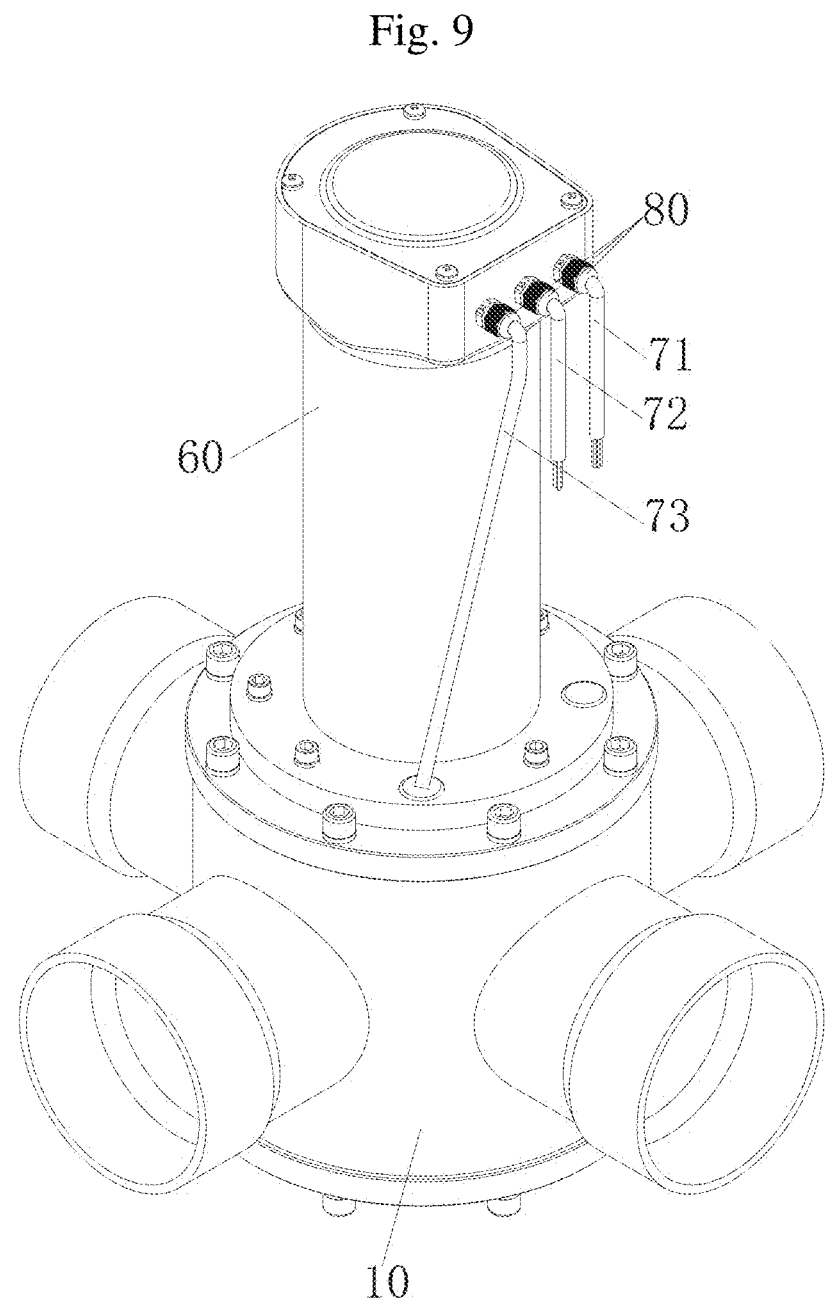
Figure 10:
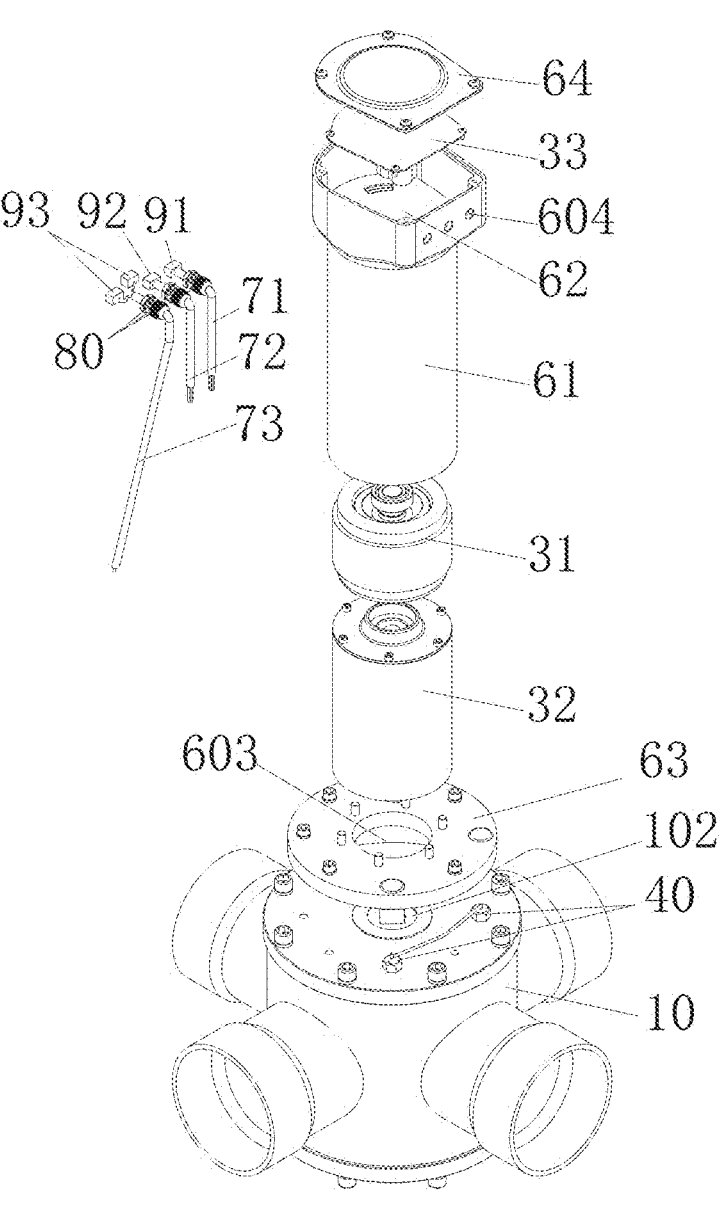
FIG. 10 illustrates a schematic exploded view of the rotary control valve provided in the embodiment 4 of the present disclosure.
Figure 11:
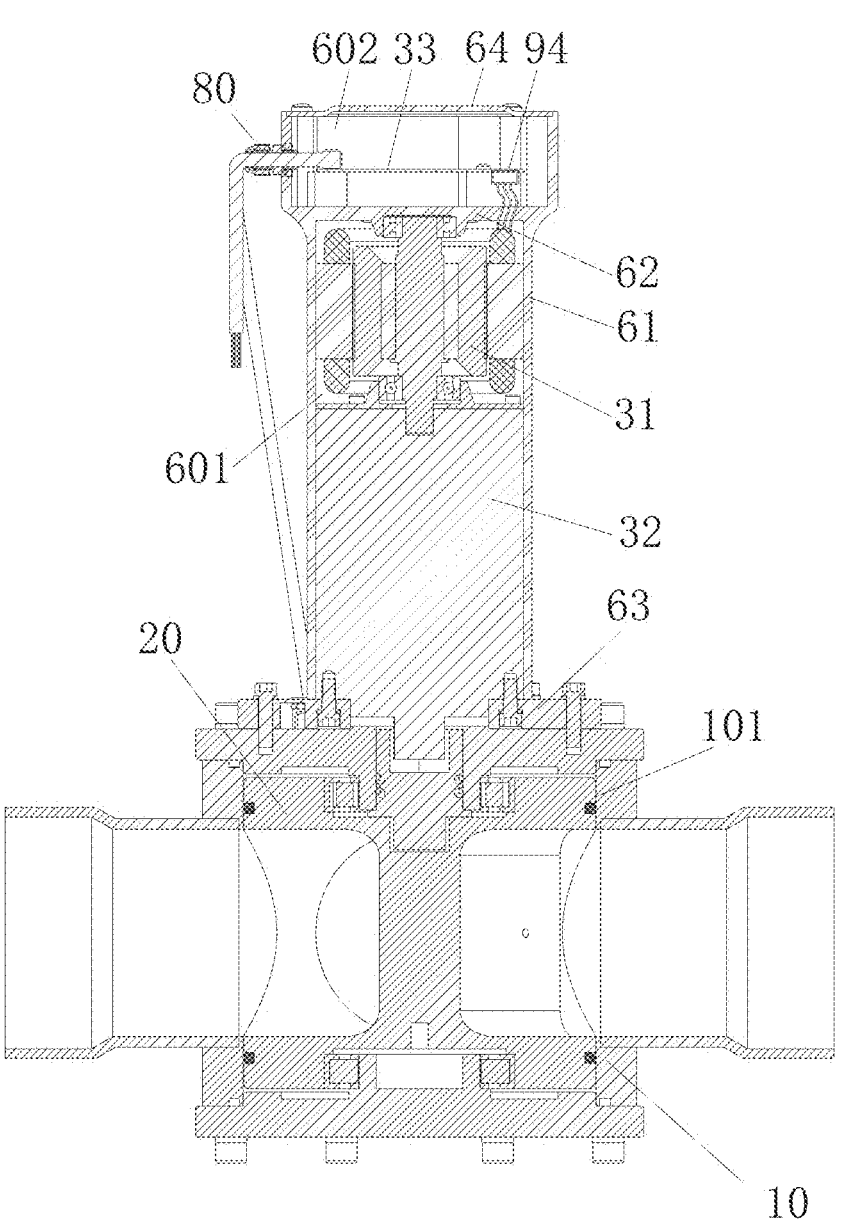
FIG. 11 illustrates a cross-sectional view of the rotary control valve provided in the embodiment 4 of the present disclosure.
Figure 12:
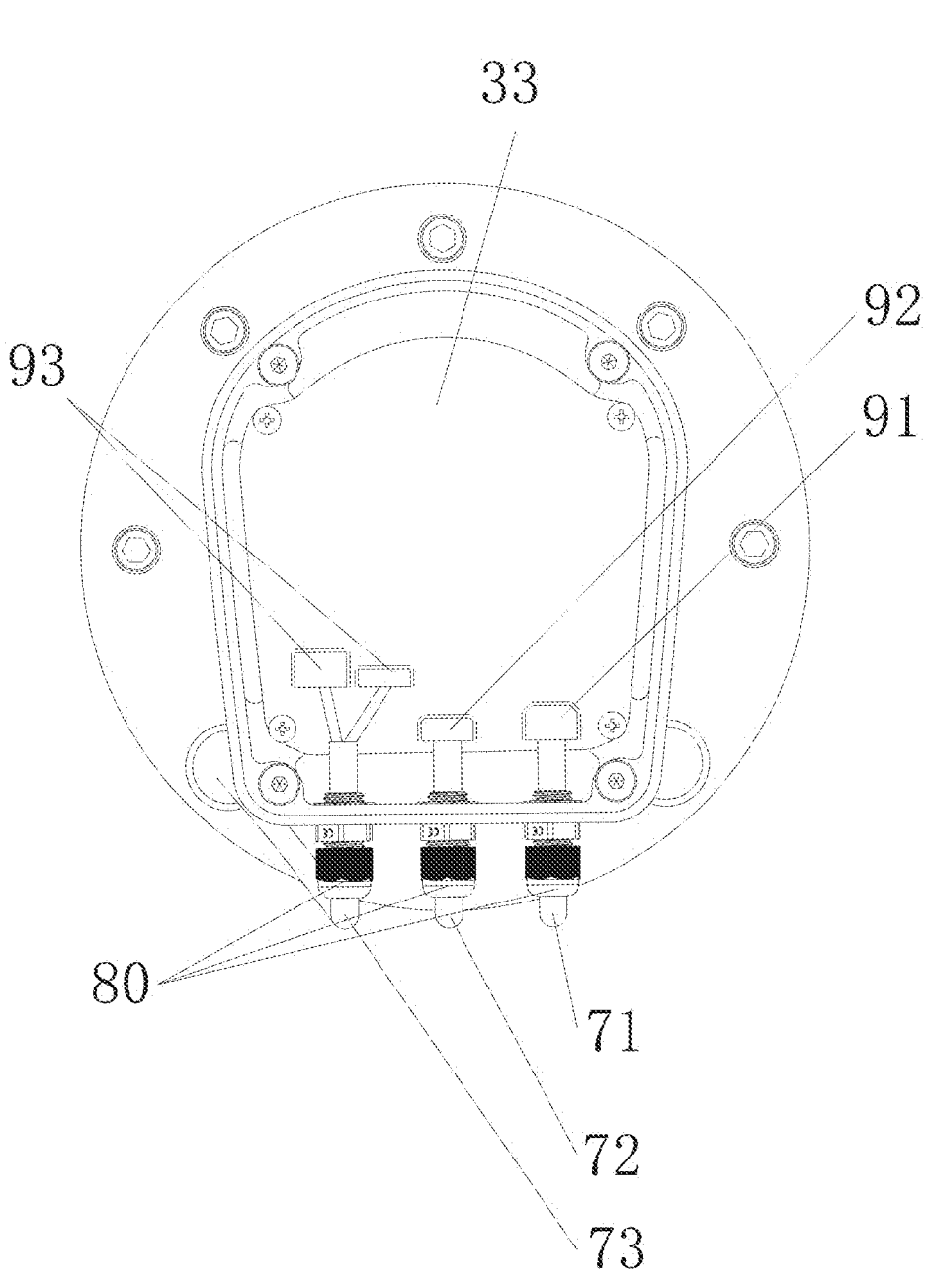
FIG. 12 illustrates a top view of the rotary control valve provided in the embodiment 4 of the present disclosure.

As shown in FIG. 9 to FIG. 11, the waterproof portion 80 has a first end and a second end disposed oppositely, the threading hole penetrates through the first end and the second end of the waterproof portion 80, and the first end of the waterproof portion 80 penetrates in the second mounting hole 604 and is detachably connected with the housing 60. Moreover, the second end of the waterproof portion 80 is located on an outer side of the housing 60. Such arrangement is convenient to sleeve the waterproof portion 80 on the cable structure and assemble the waterproof portion 80 to the housing 60.

Further, the waterproof portion 80 is a waterproof joint, an outer side wall of the waterproof joint is provided with a first threaded segment, a second threaded segment is disposed in the second mounting hole 604, and the waterproof joint is in threaded connection with the second mounting hole 604. This solution does not limit the shape of the waterproof joint. Moreover, in this embodiment, the shell of the waterproof joint is made of a metal material. Such arrangement can ensure the assembling firmness of the waterproof joint and the housing 60, and can ensure the structural strength of the waterproof joint. The waterproof joint is in threaded connection with the housing 60, which can facilitate the assembly between the waterproof joint and the housing 60, and can further ensure the waterproof effect of the waterproof portion 80.

Specifically, the housing 60 comprises a first housing and a second housing connected with each other, the first housing has the first accommodating cavity 601, the second housing has the second accommodating cavity 602, a side wall of the second housing comprises an arc wall and a plane wall connected with each other along a circumferential direction, and the second mounting hole 604 is disposed on the plane wall. The second mounting hole 604 is disposed on the plane wall, which facilitates the assembly of the waterproof joint into the second mounting hole 604 to ensure the fitting tightness of the waterproof joint and the housing 60, thereby further ensuring the waterproof effect of the waterproof joint on the second mounting hole 604.

The first housing and the second housing can be disposed separately or connected by integral molding. In this solution, the first housing and the second housing are connected by integral molding. Such arrangement can ensure the sealing performance of the housing 60.

Specifically, the housing 60 comprises a cylinder 61 and a partition portion 62, the partition portion 62 is disposed inside the cylinder 61 to form a first accommodating cavity 601 and a second accommodating cavity 602 independent of each other inside the cylinder 61, the partition portion 62 is provided with a through hole, the first accommodating cavity 601 is communicated with the second accommodating cavity 602 through the through hole, the driving mechanism also comprises a connecting cable, the connecting cable penetrates in the through hole, an end of the connecting cable is connected with the control portion 33, and another end of the connecting cable is connected with the driving portion. Specifically, the driving portion comprises a driving motor 31 and a reducing mechanism 32 connected with each other, the driving motor 31 and the reducing mechanism 32 are sequentially distributed along an axis direction of the first accommodating cavity 601, and the reducing mechanism 32 has a driving end. In this embodiment, the housing 60 has a first mounting port and a second mounting port arranged oppositely along the axis direction of the first accommodating cavity 601, the first mounting port is communicated with the first accommodating cavity 601, and the second mounting port is communicated with the second accommodating cavity 602. The housing 60 also comprises a first end cover 63 and a second end cover 64, the second penetration hole 603 is disposed on the first end cover 63, the first end cover 63 is detachably disposed at the first mounting port through bolts, and the second end cover 64 is detachably disposed at the second mounting port through bolts. Such arrangement can improve the assembling convenience of the driving structure.

Further, the driving mechanism also comprises a wiring terminal, the wiring terminal is disposed at an end of the cable structure connected with the control portion 33, and the cable structure is electrically connected with the control portion 33 through the wiring terminal. In the traditional technology, the cable structure is usually welded to the control portion. In this solution, the arrangement of the wiring terminal can facilitate the connection between the cable structure and the control portion 33, thereby further improving the assembling convenience of the driving mechanism.

As shown in FIG. 9 and FIG. 10, a plurality of second mounting holes 604 and a plurality of waterproof portions 80 are provided, the waterproof portions 80 and the second mounting holes 604 are disposed in a one-to-one correspondence manner, the cable structure comprises a plurality of cables independent of each other, the cables and the waterproof portions 80 are disposed in a one-to-one correspondence manner, a plurality of wiring terminals are provided, the wiring terminals and the cables are disposed in a one-to-one correspondence manner, and the structure of each wiring terminal is different. Such arrangement can further improve the convenience of connection between the cable structure and the control portion. Moreover, the cables and the waterproof portions 80 are disposed in a one-to-one correspondence manner, so that the waterproof effect of the waterproof portion 80 can be ensured.

As shown in FIG. 9 to FIG. 11, the rotary control valve also comprises a valve body 10. The valve body 10 has a first penetration hole 102 and a valve cavity 101 communicated with each other, and the first penetration hole 102 is disposed on an end surface of one end of the valve body 10 close to the housing 60. The housing 60 of the driving mechanism is disposed on the valve body 10, and the second penetration hole 603 of the housing 60 is communicated with the first penetration hole 102. The valve core assembly 20 is rotatably disposed in the valve cavity 101, and the driving end of the driving portion sequentially penetrates through the second penetration hole 603 and the first penetration hole 102, extends into the valve cavity 101 and is in driving connection with the valve core assembly 20. Specifically, the axis direction of the housing 60 is the same as the axis direction of the valve body 10, and the first end cover 63 of the housing 60 is connected with the end of the valve body 10 through bolts. Such arrangement can ensure the assembling convenience of the rotary control valve.

Specifically, the housing 60 of the driving mechanism is provided with three second mounting holes 604, three waterproof portions 80 are provided, the waterproof portions 80 and the second mounting holes 604 are disposed in a one-to-one correspondence manner, the cable structure comprises a power wire 71, a signal wire 72 and a sensing wire 73 independent of each other, and the power wire 71, the signal wire 72 and the sensing wire 73 penetrate in the three waterproof portions 80 correspondingly and extend into the second accommodating cavity 602 and are electrically connected with the control portion 33. The rotary control valve also comprises a sensing member 40, wherein the sensing member 40 is disposed on the valve body 10 and is configured to detect the rotation angle of the valve core assembly 20, and an end of the sensing wire 73 away from the control portion 33 is connected with the sensing member 40. Specifically, the sensing member 40 is disposed on an end surface of an end of the valve body 10 connected with the housing 60, and the sensing member 40 is connected with the control portion 33 through the sensing wire 73. Such arrangement can ensure the accuracy of the sensing member 40 in detection of the rotation angle of the valve core assembly 20, and can ensure the compactness of the structure of the rotary control valve.

As shown in FIG. 10, a plurality of sensing members 40 are provided, the sensing wire 73 has a plurality of branch wires, and the branch wires and the sensing members 40 are disposed in a one-to-one correspondence manner. This solution does not limit the number of the sensing members 40. In this embodiment, two sensing members 40 are provided, and the two sensing members 40 are distributed at an interval along a circumferential direction of the valve body 10. Such arrangement can ensure the accuracy of the sensing member 40 in detection of the rotation angle of the valve core assembly 20.

Specifically, the rotary control valve also comprises a first wiring terminal 91, a second wiring terminal 92 and a plurality of third wiring terminals 93, wherein the first wiring terminal 91 is disposed at one end of the power wire 71 connected with the control portion 33, and the power wire 71 is connected with the control portion 33 by the first wiring terminal 91; the second wiring terminal 92 is disposed at one end of the signal wire 72 connected with the control portion 33, and the signal wire 72 is connected with the control portion 33 by the second wiring terminal 92; and the plurality of third wiring terminals 93 and the branch wires are disposed in a one-to-one correspondence manner, the third wiring terminal 93 is disposed at one end of the branch wire connected with the control portion 33, and the branch wire is connected with the control portion 33 by the third wiring terminal 93. In this embodiment, two third wiring terminals 93 are provided, and the two third wiring terminals 93 and two branch wires are respectively disposed in a one-to-one correspondence manner. The driving portion is electrically connected with the control portion 33 by the connecting cable, an end of the connecting cable is connected with the driving portion, another end of the connecting cable is connected with a fourth wiring terminal 94, and the fourth wiring terminal 94 is connected with the control portion. In this solution, the structures of the first wiring terminal 91, the second wiring terminal 92, the fourth wiring terminal 94 and the plurality of third wiring terminals 93 are all different. Such arrangement can facilitate the staff to distinguish a plurality of branch wires of the power wire 71, the signal wire 72, the connecting cable and the sensing wire 73, thereby improving the assembling convenience of the rotary control valve.

The above descriptions are only preferred embodiments of the present disclosure, but are not intended to limit the present disclosure. It will be apparent to those skilled in the art that various modifications and changes can be made in the present disclosure. Any modifications, equivalent replacements, improvements, and the like made within the spirit and principle of the present disclosure shall be included within the scope of protection of the present disclosure.

The invention claimed is:

1. A rotary control valve, wherein the rotary control valve comprises:

a valve body which has a valve cavity and has a first end and a second end disposed oppositely;

a valve core assembly rotatably disposed in the valve cavity;

a driving mechanism which is disposed at the first end of the valve body, has a driving end in driving connection with the valve core assembly, and drives the valve core assembly to rotate in the valve cavity through the driving end;

a sensing member which is disposed on the valve body and is electrically connected with the driving mechanism; and a sensed member which is rotatably disposed in the valve cavity and rotates synchronously with the valve core assembly, wherein the sensing member cooperates with the sensed member in a sensing manner to detect the rotation angle of the valve core assembly.

2. The rotary control valve as claimed in claim 1, wherein the valve core assembly has a third end and a fourth end disposed oppositely, the third end is disposed close to the first end, and the sensed member is disposed on an end surface of the third end.

3. The rotary control valve as claimed in claim 2, wherein a projection of the sensing member on the third end of the valve core assembly is located on a rotation trajectory of the sensed member.

4. The rotary control valve as claimed in claim 2, wherein the end surface of the third end is provided with a limiting structure, and the limiting structure is configured to limit a position of the sensed member.

5. The rotary control valve as claimed in claim 4, wherein the end surface of the third end is provided with a limiting groove, and the sensed member is disposed in the limiting groove.

6. The rotary control valve as claimed in claim 2, wherein an end surface of the sensed member close to the first end of the valve body is flush with the end surface of the third end of the valve core assembly.

7. The rotary control valve as claimed in claim 1, wherein the sensed member is made of a magnetic material, the valve core assembly comprises a body portion and a non-magnetic-conductive portion, the driving end is in driving connection with the body portion, the non-magnetic-conductive portion is disposed on the body portion, and the sensed member is disposed on the non-magnetic-conductive portion.

8. The rotary control valve as claimed in claim 7, wherein an end surface of the body portion close to the first end is provided with a first mounting groove, and the non-magnetic-conductive portion is detachably disposed in the first mounting groove.

9. The rotary control valve as claimed in claim 1, wherein the valve core assembly comprises a body portion, pressing blocks and sealing member, a side wall of the body portion is provided with a fixing groove, the fixing groove penetrates through both ends of the body portion along an axis direction of the body portion, the sealing member is located in the fixing groove, two pressing blocks are respectively located at both ends of the sealing member, the pressing block is detachably connected with the body portion, and two pressing blocks can cooperate to limit the displacement of the sealing member relative to the body portion in an axial direction.

10. The rotary control valve as claimed in claim 1, wherein the first end is eccentrically provided with a first mounting hole, the first mounting hole penetrates through the first end, internal threads are disposed in the first mounting hole, an outer side wall of the sensing member is provided with external threads, and the sensing member is in threaded connection with the valve body through the first mounting hole.

11. The rotary control valve as claimed in claim 1, wherein the valve body is also provided with a plurality of first circulation holes, and the plurality of first circulation holes are disposed on a side wall of the valve body and are respectively communicated with the valve cavity; the rotary control valve has a refrigerating state and a heating state set relatively, and the valve core assembly can control a communicated state between the plurality of first circulation holes to switch the rotary control valve between the refrigerating state and the heating state;

the sensing member comprises a refrigerating sensing member and a heating sensing member, the refrigerating sensing member and the heating sensing member are both disposed on the valve body, the refrigerating sensing member and the heating sensing member are distributed at an interval along a circumferential direction of the valve body, and the refrigerating sensing member and the heating sensing member are electrically connected with the driving mechanism respectively; the refrigerating sensing member and the heating sensing member are located on the same circumference, a first arc segment and a second arc segment are formed between the refrigerating sensing member and the heating sensing member, and an arc length of the first arc segment is smaller than an arc length of the second arc segment; when the sensed member is located in a sensing position of the refrigerating sensing member, the rotary control valve is in the refrigerating state; and when the sensed member is located in a sensing position of the heating sensing member, the rotary control valve is in the heating state.

12. The rotary control valve as claimed in claim 11, wherein the plurality of first circulation holes are arranged at intervals on a circumferential surface of the valve body along a circumferential direction of the valve body, an interval area is formed between two adjacent first circulation holes, the refrigerating sensing member is located in one of the interval areas, and the heating sensing member is correspondingly located in another adjacent interval area.

13. The rotary control valve as claimed in claim 12, wherein the first circulation hole located between the refrigerating sensing member and the heating sensing member has a center line, and the refrigerating sensing member and the heating sensing member are symmetrically arranged relative to the center line.

14. The rotary control valve as claimed in claim 11, wherein the sensing member also comprises a return-to-zero sensing member, the return-to-zero sensing member is disposed on the valve body, the return-to-zero sensing member is electrically connected to the driving mechanism, the return-to-zero sensing member cooperates with the sensed member in a sensing manner, and the refrigerating sensing member, the return-to-zero sensing member and the heating sensing member are distributed at intervals along a circumferential direction of the valve body.

15. The rotary control valve as claimed in claim 14, wherein a projection of the return-to-zero sensing member in an axis direction of the valve body is located on the first arc segment, and the distance between the return-to-zero sensing member and the refrigerating sensing member is equal to the distance between the return-to-zero sensing member and the heating sensing member.

16. The rotary control valve as claimed in claim 1, wherein the driving mechanism comprises:

a housing which has a first accommodating cavity and a second accommodating cavity and is also provided with a second mounting hole, wherein the second mounting hole is disposed on the housing opposite to the second accommodating cavity, and the second mounting hole is communicated with the second accommodating cavity;

a control portion disposed in the second accommodating cavity;

a driving portion which is disposed in the first accommodating cavity and has the driving end, wherein the control portion is electrically connected with the driving portion;

a cable structure, wherein an end of the cable structure extends into the second accommodating cavity through the second mounting hole- and is connected with the control portion; and a waterproof portion which is provided with a threading hole for the cable structure to penetrate through, sleeves the periphery of the cable structure, and is disposed at the second mounting hole.

17. The rotary control valve as claimed in claim 16, wherein the waterproof portion has a first end and a second end disposed oppositely, the threading hole penetrates through the first end and the second end of the waterproof portion, and the first end of the waterproof portion penetrates in the second mounting hole and is detachably connected with the housing.

18. The rotary control valve as claimed in claim 17, wherein the waterproof portion is a waterproof joint, an outer side wall of the waterproof joint is provided with a first threaded segment, a second threaded segment is disposed in the second mounting hole, and the waterproof joint is in threaded connection with the second mounting hole.

19. The rotary control valve as claimed in claim 16, wherein the housing comprises a first housing and a second housing connected with each other, the first housing has the first accommodating cavity, the second housing has the second accommodating cavity, a side wall of the second housing comprises an arc wall and a plane wall connected with each other along a circumferential direction of the housing, and the second mounting hole is disposed on the plane wall.

20. The rotary control valve as claimed in claim 16, wherein the housing comprises a cylinder and a partition portion, the partition portion is disposed inside the cylinder to form a first accommodating cavity and a second accommodating cavity independent of each other inside the cylinder, the partition portion is provided with a through hole, the first accommodating cavity is communicated with the second accommodating cavity through the through hole, the driving mechanism also comprises a connecting cable, the connecting cable penetrates in the through hole, one end of the connecting cable is connected with the control portion, and the other end of the connecting cable is connected with the driving portion.

21. The rotary control valve as claimed in claim 16, wherein the driving mechanism also comprises a wiring terminal, the wiring terminal is disposed at one end of the cable structure connected with the control portion, and the cable structure is electrically connected with the control portion through the wiring terminal.

22. The rotary control valve as claimed in claim 21, wherein a plurality of second mounting holes and a plurality of waterproof portions are provided, the waterproof portions and the second mounting holes are disposed in a one-to-one correspondence manner, the cable structure comprises a plurality of cables independent of each other, the cables and the waterproof portions are disposed in a one-to-one correspondence manner, a plurality of wiring terminals are provided, the wiring terminals and the cables are disposed in a one-to-one correspondence manner, and the structure of each wiring terminal is different.

23. The rotary control valve as claimed in claim 16, wherein the housing of the driving mechanism is provided with three second mounting holes, three waterproof portions are provided, the waterproof portions and the second mounting holes are disposed in a one-to-one correspondence manner, the cable structure comprises a power wire, a signal wire and a sensing wire independent of each other, and the power wire, the signal wire and the sensing wire penetrate in the three waterproof portions correspondingly and extend into the second accommodating cavity and are electrically connected with the control portion respectively; and one end of the sensing wire away from the control portion is connected with the sensing member.

24. The rotary control valve as claimed in claim 23, wherein a plurality of sensing members are provided, the sensing wire has a plurality of branch wires, and the branch wires and the sensing members are disposed in a one-to-one correspondence manner.

25. The rotary control valve as claimed in claim 24, wherein the rotary control valve also comprises:

a first wiring terminal disposed at one end of the power wire connected with the control portion, wherein the power wire is connected with the control portion through the first wiring terminal;

a second wiring terminal disposed at one end of the signal wire connected with the control portion, wherein the signal wire is connected with the control portion through the second wiring terminal; and a plurality of third wiring terminals, wherein the third wiring terminals and the branch wires are disposed in a one-to-one correspondence manner, the third wiring terminal is disposed at one end of the branch wire connected with the control portion, and the branch wire is connected with the control portion through the third wiring terminal.

26. A control method of a rotary control valve, wherein the control method is suitable for the rotary control valve as claimed in claim 11, and the control method comprises:

step 1: starting the rotary control valve, acquiring a starting position of the sensed member of the rotary control valve, and judging whether the starting position is located in the sensing position of the refrigerating sensing member or the heating sensing member of the rotary control valve; and step 2: if the starting position is located in the sensing position of the refrigerating sensing member or the heating sensing member, controlling the valve core assembly and the sensed member of the rotary control valve to rotate through the driving mechanism of the rotary control valve, and enabling the sensed member to rotate in a projection area of the first arc segment to switch the rotary control valve between the refrigerating state and the heating state.

27. The control method of a rotary control valve as claimed in claim 26, wherein the control method also comprises:

step 3: if the starting position is not located in the sensing position of the refrigerating sensing member or the heating sensing member, driving the sensed member to rotate through the driving mechanism; when the sensed member rotates to the sensing position of the refrigerating sensing member or the heating sensing member, judging whether the sensing position is a target position; if the sensing position is the target position, enabling the driving mechanism to stop working; and if the sensing position is not the target position, controlling the valve core assembly and the sensed member to rotate oppositely through the driving mechanism to enable the sensed member to rotate to the next sensing position.

28. The control method of a rotary control valve as claimed in claim 26, wherein the sensing member also comprises a return-to-zero sensing member, the return-to-zero sensing member is disposed on the valve body, the return-to-zero sensing member is electrically connected to the driving mechanism, the return-to-zero sensing member cooperates with the sensed member in a sensing manner, and the refrigerating sensing member, the return-to-zero sensing member and the heating sensing member are distributed at intervals along a circumferential direction of the valve body, a projection of the return-to-zero sensing member in an axis direction of the valve body is located on the first arc segment, and the distance between the return-to-zero sensing member and the refrigerating sensing member is equal to the distance between the return-to-zero sensing member and the heating sensing member, and the control method also comprises:

step 4: if the starting position is not located in the sensing position of the refrigerating sensing member or the heating sensing member, driving the sensed member to rotate to the sensing position of the return-to-zero sensing member of the rotary control valve through the driving mechanism of the rotary control valve, and then, driving the sensed member to rotate to a target position through the driving mechanism.

* * * * *